(12) United States Patent
Heirman et al.

(10) Patent No.: US 10,877,886 B2
(45) Date of Patent: Dec. 29, 2020

(54) STORING CACHE LINES IN DEDICATED CACHE OF AN IDLE CORE

(71) Applicant: Intel Corporation, Santa Clara, CA (US)

(72) Inventors: Wim Heirman, Ghent (DE); Kristof Du Bois, Aalst (DE); Yves Vandriessche, Kontich (DE); Stijn Eyerman, Evergem (DE); Ibrahim Hur, Hillsboro, OR (US); Erik Hallnor, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 15/940,712

(22) Filed: Mar. 29, 2018

(65) Prior Publication Data
US 2019/0303294 A1    Oct. 3, 2019

(51) Int. Cl.
*G06F 12/0811*    (2016.01)
*G06F 12/128*    (2016.01)
*G06F 12/0871*    (2016.01)
*G06F 12/0815*    (2016.01)

(52) U.S. Cl.
CPC ...... *G06F 12/0811* (2013.01); *G06F 12/0815* (2013.01); *G06F 12/0871* (2013.01); *G06F 12/128* (2013.01)

(58) Field of Classification Search
CPC ............. G06F 12/0811; G06F 12/0815; G06F 12/128; G06F 12/0871
See application file for complete search history.

(56) References Cited

U.S. PATENT DOCUMENTS

| | | | |
|---|---|---|---|
| 8,161,242 B2 * | 4/2012 | Qureshi | G06F 12/0802 711/118 |
| 2017/0024329 A1 * | 1/2017 | Ishii | G06F 12/126 |
| 2017/0300427 A1 * | 10/2017 | Lin | G06F 12/128 |

* cited by examiner

*Primary Examiner* — David Yi
*Assistant Examiner* — Alan Otto
(74) *Attorney, Agent, or Firm* — Nicholson De Vos Webster & Elliott, LLP

(57) ABSTRACT

Embodiment of this disclosure provides a mechanism to store cache lines in dedicated cache of an idle core. In one embodiment, a multi-core processor comprising a first core, a second core, a first cache, a second cache, a third cache, and a cache controller unit is provided. The cache controller is operatively coupled to at least the first cache, the second cache, and the third cache. The cache controller is to evict a first line from the first cache, wherein the first core is in an active state. Responsive to the evicting of the first line, the first line is stored in the third cache. Responsive to storing the first line, a second line is evicted from the third cache. Responsive to evicting the second line, the second line is stored in the second cache when the second core is in an idle state.

20 Claims, 12 Drawing Sheets

400

```
┌─────────────────────────────────────────────────────────────┐
│ evict a first line from a first cache dedicated to a first  │
│ core of a multi-core processor, wherein the first core is   │
│                    in an active state                        │
│                           410                                │
└─────────────────────────────────────────────────────────────┘
                              │
                              ▼
┌─────────────────────────────────────────────────────────────┐
│ in response to evicting the first line, store the first     │
│ line in a third cache, wherein the third cache is shared    │
│             with the first core and a second core            │
│                           420                                │
└─────────────────────────────────────────────────────────────┘
                              │
                              ▼
┌─────────────────────────────────────────────────────────────┐
│  in response to storing the first line, evict a second      │
│                  line from the third cache                   │
│                           430                                │
└─────────────────────────────────────────────────────────────┘
                              │
                              ▼
┌─────────────────────────────────────────────────────────────┐
│ in response to evicting the second line, store the second   │
│ line in a second cache dedicated to the second core,         │
│         wherein the second core is in an idle state          │
│                           440                                │
└─────────────────────────────────────────────────────────────┘
```

STORING CACHE LINES IN DEDICATED CACHE OF AN IDLE CORE

TECHNICAL FIELD

Embodiments of the disclosure relate generally to hardware processors, and more specifically, but without limitation, to storing cache lines in dedicated cache of an idle core.

BACKGROUND

Some conventional many-core processing systems implement smaller per-core caches and a larger last-level cache. Typically, the last-level cache is available to each running core. For many workloads, in such a system, the small per-core capacity necessitates frequent round-trips to the last-level cache which results in performance degradation such as high latency.

The architecture described above triggered a trend in many-core processor systems to use more exclusive cache hierarchy. This favors larger per-core private (or dedicated) mid-level caches over shared last-level cache capacity. This cache hierarchy implementation provides benefits for applications with mostly private data. However, it leaves the mid-level cache capacity of unused cores inaccessible when undersubscribing the system (e.g., spawning fewer threads than cores, which can be beneficial for some applications to ensure the working set fits in on-chip capacity, or to avoid synchronization bottlenecks). More specifically, private caches are inaccessible when the corresponding core is unused, which can result in performance degradation of poorly scaling workloads that are unable to utilize each of the cores effectively.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 illustrates a flow diagram for storing cache lines in dedicated cache of an idle core according to various embodiments.

DETAILED DESCRIPTION

In many-core processor systems that implement larger per-core private (or dedicated) mid-level caches over shared last-level cache capacity, the mid-level cache capacity of unused cores is inaccessible. The combination of the limited last-level cache capacity and the inaccessibility to dedicated cache of unused cores can result in performance degradation.

As will be described in further detail below, various embodiments described herein, overcome this performance degradation. In general, the mid-level cache of unused cores is accessible as additional victim cache capacity. This effectively extends the last-level cache (LLC) to include otherwise inaccessible storage space. As a result, the effective on-chip cache capacity is increased. This in turn reduces off-chip memory accesses and the resulting performance and energy penalties of the off-chip memory accesses.

Figure 1:
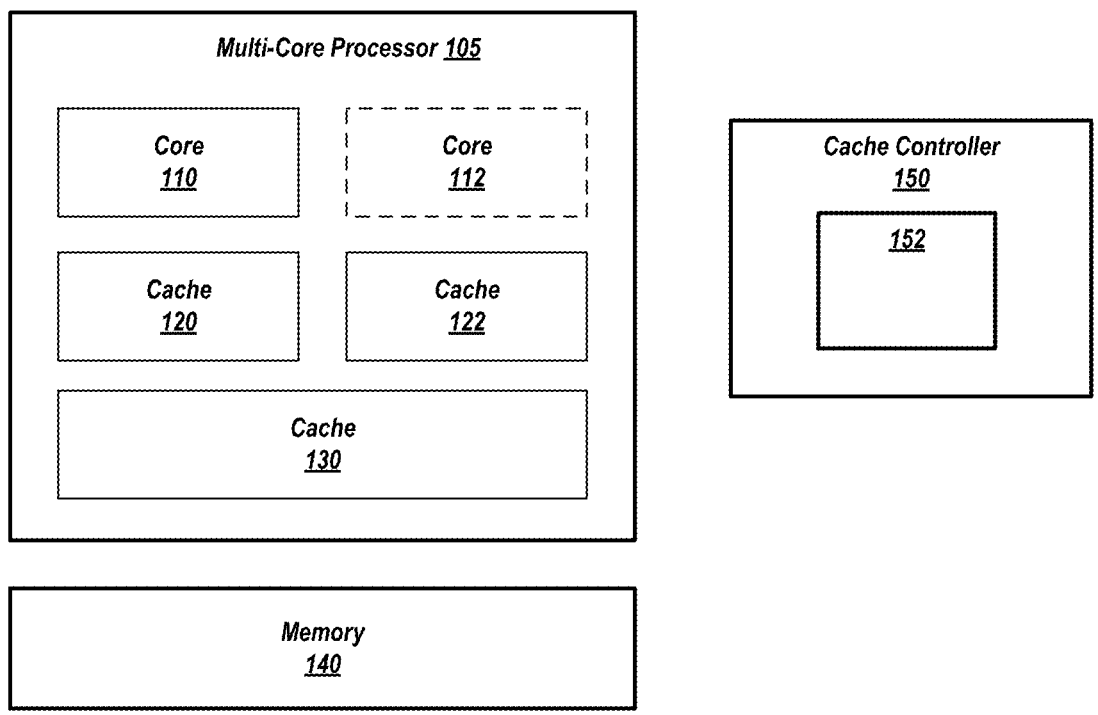
FIG. 1 illustrates a block diagram of a system to store cache lines in dedicated cache of an idle core according to various embodiments.

FIG. 1 illustrates a block diagram of system 100 according to various embodiments. System 100 includes multi-core processor 105 that includes multiple cores, such as core 110 and core 112. It should be appreciated that multi-core processor 105 includes two or more cores. The cores can be one of many different types of cores. For example, the cores can be, but are not limited to, a processing core or a graphics core.

Multi-core processor 105 includes cache 120 and cache 122. In various embodiments, each core of multi-core processor 105 has an inclusive private cache hierarchy. For example, cache 120, in one embodiment, is a dedicated (or private) cache to core 110. That is, cache 120 can be accessed by core 110 and is not accessible to other cores (e.g., core 112). Similarly, cache 122, in one embodiment, is a dedicated (or private) cache to core 112. That is, cache 122 can be accessed by core 112 and is not accessible to other cores (e.g., core 110).

In various embodiments, the cache hierarchy includes a first-level cache (FLC) and a mid-level cache (MLC). For example, cache 120 includes a FLC and a MLC. Similarly, for example, cache 122 includes a FLC and a MLC. Alternatively, cache 120 and cache 122 may not include one or more of FLC and MLC, respectively.

Additionally, in the inclusive private cache hierarchy, in cache 120, the MLC (that is larger than the FLC) includes each of the lines in the FLC. Similarly, in cache 122, the MLC (that is larger than the FLC) includes each of the lines in the FLC. It should be appreciated that the MLC may or may not be larger than the FLC.

Cache 130, in one embodiment, is a shared cache to the cores in multi-core processor 105. For example, cache 130 is a shared cache to core 110 and core 112. In some embodiments, cache 130 is shared between at least two cores in multi-core processor 105. However, cache 130 may not be shared with one or more cores of multi-core processor 105 (e.g., cores other than core 110 and core 112).

In various embodiments, cache 130 is not inclusive of the other on-chip caches (e.g., cache 120 and cache 122).

Additionally, cache 130 is managed as victim cache. That is, evictions from cache 120 and/or cache 122 results in allocations into cache 130.

Cache 130, in an embodiment, is a last-level cache (LLC). Typically, an eviction from an LLC is sent off-chip to memory (not shown). However, as will be described in further detail below, an eviction from cache 130 will stay on-chip and be sent to cache of an unused core (e.g., cache 122 of core 112). Accordingly, a cache of an unused core can be utilized as an extension of cache 130.

In one embodiment, a core of multi-core processor 105 is in an idle state. For example, core 112 is at a power state that is less than an active power state or is in a partially power-gated state. Typically, in some conventional systems, when a core is in an idle state (e.g., less than an active power state or in a partially power-gated state) then the dedicated cache to the idle core is also idle and inaccessible. However, as described herein, a dedicated cache to an idle core is not power-gated. For example, when core 112 is in an idle state, cache 122 remains active and is not power-gated. This results in cache 122 being available for reads/writes from other active cores.

The following description generally describes the process of utilizing a dedicated cache (e.g., cache 122) of an idle core (e.g., core 112). In one embodiment, a cache line is evicted from cache 120 (a dedicated cache to core 120) when core 110 is an active state. In response to the eviction of the cache line from cache 120, the cache line is stored in cache 130 (e.g., a LLC). In response to storing the first cache line in the cache 130, a second cache line is evicted from cache 130. In response to evicting the second cache line from cache 130, the second cache line is stored in cache 122 of core 112 (while core 112 is in an idle state). It is noted that in conventional systems, a cache line evicted from cache 130 is typically evicted off-chip to memory. Moreover, a dedicated cache to an idle core is power gated which results in the dedicated cache unavailable for read/writes. However, as described herein, cache 130 is effectively extended (also referred to as extended cache) and evictions from cache 130 remain on-chip by being stored in cache 122 of idle core 112. It is further noted, in one embodiment, in response to storing a second cache line in cache 122, a third cache line in cache 122 is evicted off-chip to memory 140.

System 100 also includes cache controller unit 150 that includes logic 152 for enabling extended cache, which will be described further with respect to at least FIG. 2. Additional description of utilizing a dedicated cache of an idle core is provided in further detail below.

Figure 2:
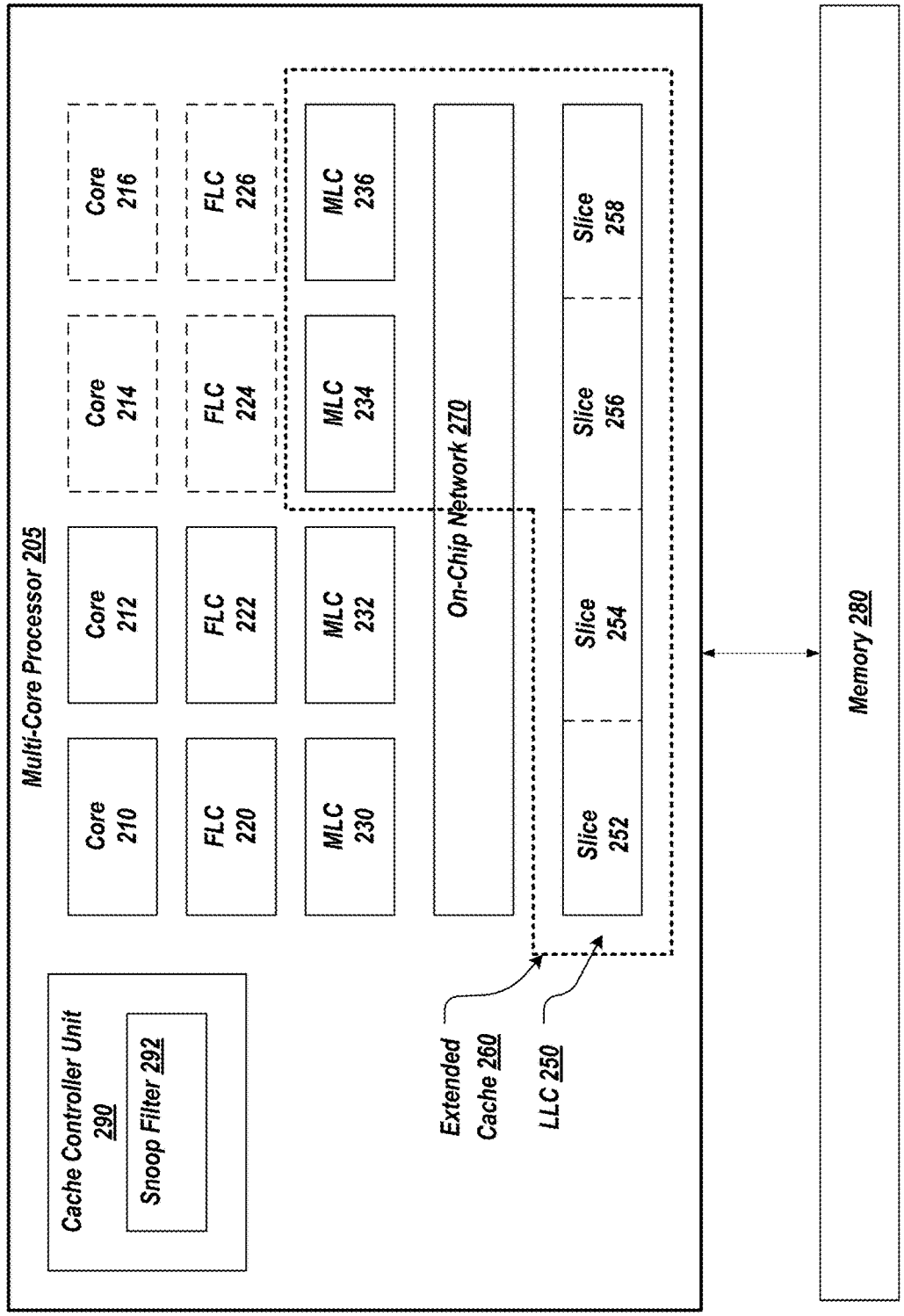
FIG. 2 illustrates a block diagram of a system to store cache lines in dedicated cache of an idle core according to various embodiments.

FIG. 2 illustrates a block diagram of system 200 according to various embodiments. In one embodiment, system 200 is a more detailed embodiment of system 100 described above. System 200 includes multi-core processor 205. Multi-core processor 205 includes multiple cores, such as core 210, core 212, core 214 and core 216. An on-chip communication network 270 allows all processors to communicate with the LLC 250 and with each other. It should be appreciated that multi-core processor 205 includes more or less cores than depicted in FIG. 2.

Multi-core processor 205 includes an inclusive private cache hierarchy. For example, multi-process device 205 includes FLC 220 (dedicated to core 210), FLC 222 (dedicated to core 212), FLC 224 (dedicated to core 214), and FLC 226 (dedicated to core 216). Additionally, multi-core processor 205 includes MLC 230 (dedicated to core 210), MLC 232 (dedicated to core 212), MLC 234 (dedicated to core 214) and MLC 236 (dedicated to core 216). In an inclusive private cache hierarchy, in one embodiment, the MLC contains all the lines that are in its respective FLC. For example, MLC 230 contains all of the lines that are in the FLC 220, MLC 232 contains all the lines of FLC 222, MLC 234 contains all the lines of FLC 224, and MLC 236 contains all the lines of FLC 226. Alternatively, a MLC may not include all the lines that are in the respective FLC.

FIG. 2 depicts core 214 and 216 in an idle state (represented by the dashed lines of core 214 and core 216). When a core is unused (in an idle state), typically no software threads are actively running on the idle core. In convention systems, when a core is in an idle state the associated circuitry (e.g., FLC and MLC) is also in an idle state and inaccessible while the associated core remains idle. In particular, in conventional systems, the MLC is inaccessible to any software thread running on the chip. However, as will be described in further detail below, MLC of unused cores, in combination with LLC 250, will be available in extended cache 260.

LLC 250, in various embodiments, is not inclusive of the other on-chip caches and is managed as a victim cache. For example, evictions from MLCs result in allocations into LLC 250. Optionally, in various embodiments, the evictions into LLC 250 may be predicated on some algorithm that may decide to drop some block altogether, such as a dead block predictor.

In some embodiments, LLC 250 is a logically shared and physically partitioned LLC. For example, physical address space is split over a set of slices in LLC 250 (e.g., slice 252, slice 254, slice 256 and slice 258). Each slice may handle last-level caching and on-chip coherency (e.g., MESIF or MOESIF) for a distinct set of addresses. LLC 250, in some embodiments, is combined with a snoop filter, such as snoop filter (SF) 292. It should be appreciated that LLC 250 may include cache controller unit 290. However, cache control unit 290 may be separate from LLC 250.

The following description describes utilizing a dedicated cache of an idle core, in accordance to various embodiments, with respect to at least FIG. 2. When a cache line is evicted from the LLC 250, for which there are no sharers (e.g., SF 292 indicates that no private MLC holds a copy of the line), idle (or unused) core 214 is selected, for example, by way of a target map.

In various embodiments, each LLC slice has its own target map. A target map is a list of unused cores that are available for accepting victim blocks. This list is specific to each LLC slice and can be set through a (set of) configuration register(s). On an LLC evict, an entry from the target map is selected. For example, an idle core is selected either in round-robin fashion (to optimize load over all unused cores), or by computing a hash function of the address involved (to avoid run-to-run variability). It should be appreciated that the selection between round-robin or hashed modes can be fixed at design time, or selected through a configuration register, depending on the implementation. In one embodiment, if all cores are in use, or if all cores are unused, forwarding victims to a MLC of an idle core is disabled. In some embodiments, when the list of unused cores changes, the target map for each LLC slice is updated. In some embodiments, if at least one core is unused, the target map is utilized. A target map can be implemented by various means, such as an algorithm, which will be described in further detail below.

An allocate message is sent to idle core 214 indicating the address of the line being evicted from LLC 250 and its data as it was held in LLC 250. Idle core 214 is marked in the SF 292 as the owner (forwarder) for the line evicted from LLC 250. This way, through the existing coherency protocol (e.g., MESIF or MOESIF coherency protocol), a future demand request for this line from another core (e.g., core 212) will ask for data to be forwarded from the selected core, rather than having to load the data from off-chip memory.

When an allocate message is received, the corresponding cache line is stored in MLC 234 of idle core 214 using the normal allocation and replacement policy. Any evictions caused by storing the cache line in MLC 234 may be handled in a normal fashion with respect to coherency traffic and write-back to main memory. However, it is noted that an eviction from MLC 234 does not cause a subsequent LLC allocation (these should be seen as evicts out of the extended cache 260, therefore it is not desirable to store these lines in the regular LLC 250).

When forwarding a cache line from MLC 234 connected to an unused core 214, the line is removed from MLC 234 (and therefore from extended cache 260). Conventional operation would keep the line in MLC 234, as the core is likely using it, but in the case of an unused core, the line is removed from MLC 234. This results in the line removed from extended cache 260, since there is now a new on-chip copy of this line available in the MLC of the active core that just requested it (e.g., in MLC 232 of active core 212).

It should be appreciated that unused cores that have their MLC participate in extended cache 260 are not able to power gate their MLC data array and its controller. As such, the MLC of an unused core is able to take part in coherency traffic (e.g., storing extended LLC data in the MLC, responding to allocate, and forwarding messages). However, the idle cores themselves including their respective FLCs can still be power-gated so the power cost of leaving the MLC on is low. The power usage of an MLC of an idle core should be more than compensated for by the energy savings of the off-chip memory traffic reduction that is caused by keeping more data on-chip.

As described above, a target map is a list of unused cores that are available for accepting victim blocks and can be implemented via an algorithm. The following description describes an algorithm utilized to build a target map according to various embodiments.

Algorithm 1: construction of target lists
n=number of LLC slices
u=number of unused cores
U=list of unused cores, U[i]=core number of $i^{th}$ unused core
T[j]=target list for LLC slice number j
e=maximum size of each target list
Initialize all T[j] to an empty list
Targets per unused core: c=ceil(n*e/u)
j=0
For i=0 to u−1:
  For k=0 to c−1:
    If length of T[j]==e: end algorithm
    Append U[i] to T[j]
    j=(j+1) mod n Algorithm 1 builds a list of targets T[j] for each LLC slice (j=0 . . . n−1). Each target list can hold up to e entries (this can be a design-time parameter). Each entry points to one of the unused cores taken from list U. There are a total of n*e target entries, and u unused cores. On average each unused core shows up at n*e/u different locations. A given unused core will be in the target list of multiple different LLC slices, and may occur in the same target list more than once. To ensure that LLC victim cache lines are evenly distributed over all unused cores, multiple occurrences of an unused core should be spread out over as many LLC slices as possible. Adjacent LLC slices should not have identical target lists whenever possible to prevent network hotspots. Computation of the target lists needs to be computationally inexpensive to ensure the bookkeeping involved in core sleep/wakeup does not become excessive. Algorithm 1 provides a good tradeoff between both concerns.

In some embodiments, on large chips, it may be beneficial to partition the chip into smaller parts that each contain a subset of all cores and LLC slices that are close together from the point of view of the on-chip network (e.g., a quadrant out of a 2-D mesh). This way, traffic related to the management of victims is localized which minimizes latency and reduces interference of this traffic with the other network traffic. Also, when a particular core enters/leaves the unused cores list, only the LLC slices in the same partition need to have their target maps recomputed, rather than always having to do this for the entire coherence domain.

In some embodiments, when partitioning is used, the target map update algorithm is run for the partition only, with N=number of LLC slices in the partition, U/u=unused cores inside that partition. In some embodiments, on a many-core server or high performance computing (HPC) class processor, partitioned into quadrants, typical values could be N=20 and e=8. Storage space for each target map in this case is 8 entries of 5 bits each (to encode one of 20 target cores) which can easily fit inside a single 64-bit configuration register for each LLC slice.

Figure 3:
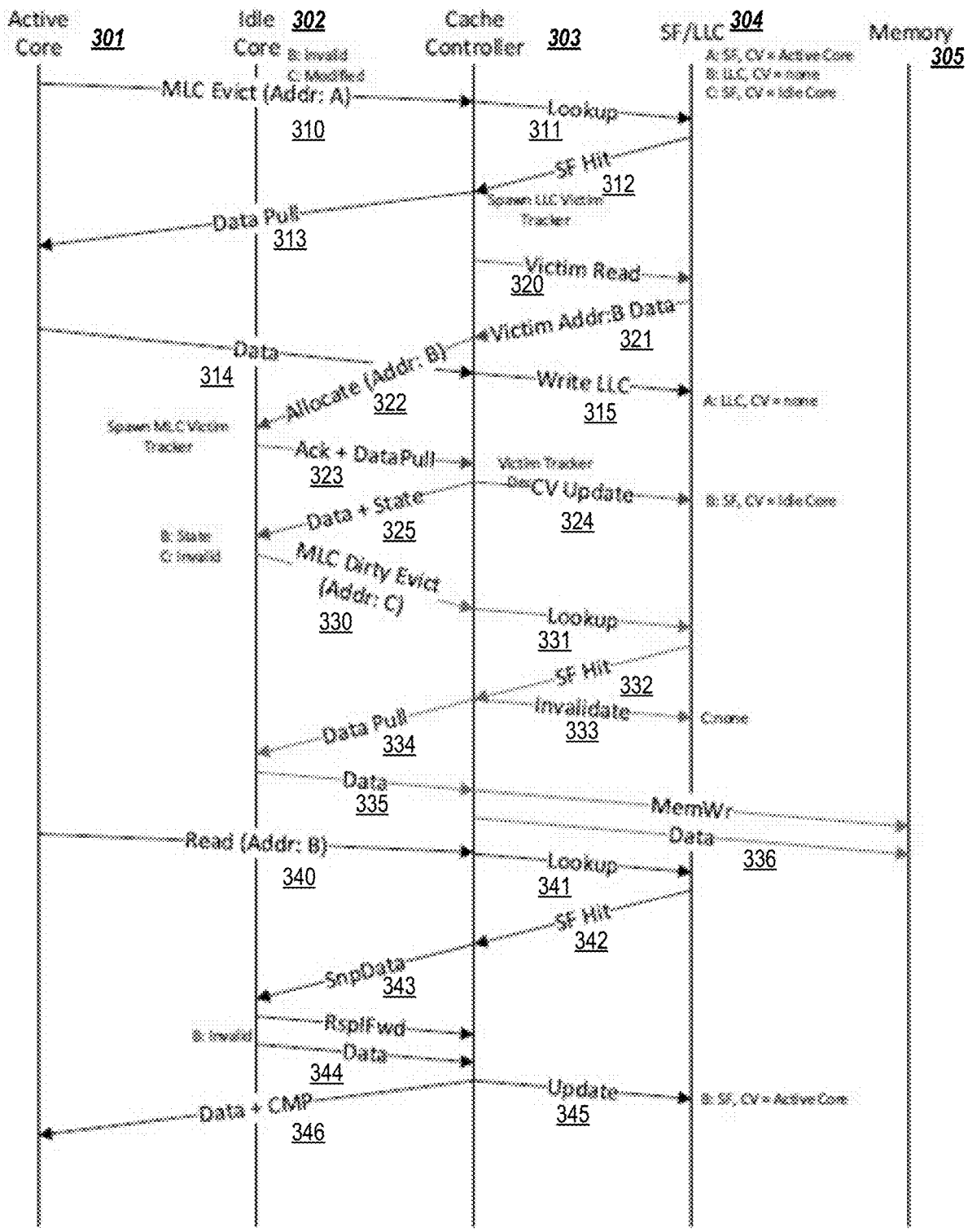
FIG. 3 illustrates a flow diagram for storing cache lines in dedicated cache of an idle core according to various embodiments.

FIG. 3 illustrates a flow diagram of method 300 for storing a cache line in dedicated cache of an idle core, according to an embodiment. Steps 310-315 of method 300 are directed to eviction of cache line "A" from active core 301 (e.g., core 110 or core 212) to LLC 304 (e.g., cache 130 or LLC 250). Steps 320-325 of method 300 are directed to eviction of cache line "B" from LLC 304 to a MLC of idle core 302 (e.g., cache 122 of core 112 or MLC 234 of core 214). Steps 330-336 of method 300 are directed to eviction of cache line "C" from a MLC of idle core 302 to memory 305 (e.g., memory 280). Steps 340-346 of method 300 are directed to reading cache line "B" from a MLC of idle core 302 to active core 301. It should be appreciated that, in embodiment, cache controller 303 (e.g., cache controller unit 290) is the logic that drives the method steps described herein. Additionally, SF/LLC 304 is the combination of snoop filter (e.g., SF 292) and LLC (e.g., LLC 250).

At step 310, cache line A is evicted from active core 301. For example, cache line A is evicted from MLC 232 of core 212. At step 311, a look up is directed by cache controller 303. For example, cache control 303 requests and receives a copy of cache line A. Additionally, cache control 303 determines that SF/LLC 304 needs to evict cache line B to make room for cache line A in SF/LLC 304. It should be appreciated that at least at step 311, it is determined that cache line A is located in the SF (represented by "A:SF") and the "core valid" (or core ID) status (represented by "CV") for cache line A is active core. Likewise, the status for cache line B is "B: LLC, CV=none," and the status for cache line C is "C: SF, CV=Idle Core". At steps 312 and 313, SF/LLC 304 requests a copy of cache line A and the content of cache line A is then directed to SF/LLC 304 via an MLC evict message. At steps 314 and 315, cache line A is pulled from active core 301 and written to SF/LLC 304. The status of cache line A is then "A: LLC, CV=none".

At step 320, cache controller 303 determines that cache line B is a victim from SF/LLC 304 to make space for cache line A (prior to cache line A being stored in SF/LLC 304). At steps 321 and 322, cache controller 303 receives the address of cache line B from SF/LLC 304. At step 323, the MLC of the idle core receives the allocate message for cache line B. Accordingly, the MLC of the idle core sends an acknowledgement to cache controller 303. At step 324, the SF is updated to indicate that idle core 302 has a copy of cache line B. Accordingly, the status of cache line B is "B:SF, CV=idle". At 325, cache controller 303 communicates that data is coming back to idle core 302. It should be appreciated that cache line B is stored in the MLC of idle core 302 rather than being evicted to memory. Thus, the MLC of the idle core can be used as a victim cache extension of the LLC.

At steps 330 and 331, cache line C is moved from the idle core. Cache controller 303 receives communication that the idle core no longer wants cache line C and cache line C needs to be evicted to memory 305. At steps 332 and 334, SF/LLC 304 requests a copy of cache line C and the content of cache line C is then directed to SF/LLC 304 via an evict message. At steps 335 and 336, cache line C is pulled from the MLC of idle core 302 and written to memory 305.

At steps 340 and 341, cache line B is in the MLC of the idle core, active core 301 seeks to read cache line B. Accordingly, active core 301 sends a message to cache controller 303. Cache controller 303 looks up the location of cache line B. The SF knows that cache line B is in the MLC of the idle core.

At steps 342 and 343, the SF tells cache controller 303 that the location of cache line B is in the MLC of the idle core. Cache controller 303 sends out a message to the idle core requesting cache line B. At step 344, a Response Invalidate Forward (RspIFwd) is provided to cache controller 303 notifying the cache controller that it is forwarding the data of cache line B (and subsequently throwing away the data). At step 345, the SF is updated with new location of cache line B (e.g., B:SF, CV=Active Core). At step 346, the data of cache line B and a confirmation message (CMP) are sent to the active core 301.

FIG. 4 depicts a flow diagram of method 400 for storing a cache line in dedicated cache of an idle core, according to an embodiment.

At step 410, a first cache line is evicted from a first cache dedicated to a first core of a multi-core processor. The multi-core processor is in an active state. For example, cache line A is evicted from MLC 230 that is a dedicated cache to active core 210.

At step 420, in response to evicting the first line, the first line is stored in a third cache. For example, in response to cache line A being evicted from MLC 230, cache line A is stored in LLC 250.

At step 430, in response to storing the first line, a second line is evicted from the third cache. For example, in response to storing cache line A in LLC 250, cache line B is evicted from LLC 250.

At step 440, in response to evicting the second line, the second line is stored in a second cache dedicated to a second core. The second core is in an idle state. For example, cache line B (rather than being evicted to memory 280) is stored in MLC 236. MLC 236 is a dedicated cache to core 216 which is in an idle state. Cache line B can be considered to be stored in extended cache 260 because cache line B remains on-chip in MLC 236 (rather than being evicted to memory 280) subsequent to being evicted from LLC 250.

The following description describes various embodiments regarding the core transitioning between used and unused states (or idle and active states). In some embodiments, when a core transitions between the used and unused states, the target maps of all LLC slices that can potentially target this core (e.g., all LLC slices in the partition) need to be updated. This core will now, as part of its sleep/wakeup process, recompute all (potentially) affected the target maps and write the new target map to the target map configuration register in each LLC slice. Because target map construction may be straightforward, and there are a limited number of potentially affected LLC slices (N=20 in the example above), this extra activity does not significantly lengthen the sleep/wakeup cost which typically is hundreds of clock cycles or (much) more for deeper sleep states. The target map reconstruction can either happen as part of the microcode and thus be invisible to software (making the target map configuration register inaccessible to software); or it can be implemented as part of the operating system which would expose the target map registers to (privileged) software.

It is noted that scrubbing operations on the (potentially large) per-core MLC cache may not be needed as part of the sleep/wakeup process. When a core goes to sleep, it can leave its last-used data in the MLC (this is the default behavior for those sleep states that do not power-gate the MLC). When allocate messages arrive that fill the MLC with victim data, the original MLC content may be naturally evicted (and when dirty, written out to main memory) using the existing cache management mechanisms. Likewise, on wakeup, the data in MLC which was brought in as victims from other cores can be left in-place, where it will gradually be replaced by the core's new working set. Expensive scrubbing of MLC content on sleep or wakeup may not be required which may save on potential sleep/wakeup cost. Moreover, if the sleep period is short, and the core resumes with the same software context it was running before going to sleep, then the thread's working set may still be present in the MLC if no significant extended LLC related traffic was received during the sleep period.

The following description describes various embodiments regarding the replacement policy of the cache hierarchy. The extended cache is managed as a victim cache, and allocates lines that were evicted by the MLCs (or L2 cache) of active cores. In some embodiments, lines are first inserted into the regular LLC slices. In some embodiments, any existing method to selectively allocate victim lines (e.g. dead block predictor) can remain as-is. Once in the LLC, using (pseudo) Least Recently Used (LRU) replacement, each LLC set can be seen as a first in, first out (FIFO) queue that accepts new lines at the front, pushing existing lines as they age towards the back of the queue until they fall out and an eviction occurs—or until they receive a hit in which case the line is removed from the LLC (and installed in the requesting core's FLC and/or MLC). The MLC slices that make up the extended cache can be seen as an extension of this queue: as a line falls out of the regular LLC it can be seen as being added at the front of an extended queue in an unused MLC, where again it ages using (pseudo) LRU until it falls out at the back (that causes an actual evict and, if dirty, writeback to main memory) or receives a hit and is moved from the extended cache into an active MLC. It is noted that lines are not moved from an unused MLC back into the regular LLC, even when space is freed in the regular LLC slice (either due to hits or invalidations). Once a line is moved to an unused MLC its primary options are to be evicted, or move to an active MLC. When the LLC insertion policy is such that shared lines are also allocated, a hit on the unused MLC should not be seen as a regular hitS or hitME and should not lead to LLC allocation. However, a later request may see a hitS or hitME on the same line in an active MLC which does lead to LLC allocation.

It should be appreciated that some architectures do not have an LLC. Embodiments described herein directed to storing cache lines into cache dedicated to an idle core can be extended to this type of architecture. For example, rather than LLC slices, some architectures that do not have an LLC include a distributed snoop filter which acts in the same way as the LLC slice described above. However, the distributed snoop filter does not store any data. Conceptually, this architecture provides a zero-capacity LLC slice where MLC victims are often discarded. Applying various embodiments described herein to this architecture, a target list is added to each snoop filter slice, managed as described herein and constructed using Algorithm 1. However, rather than using the target list to allocate LLC victims into unused core's MLC caches, the target list is used to allocate MLC victims directly.

The following description describes various embodiments dynamically enabling the extended cache. In some embodiments, the area cost of adding an extended cache is negligible. For example, an area cost is the target lists at each LLC slice. However, there can be small power cost if the extra extended cache capacity is not used effectively because the MLCs of unused cores and their associated control logic needs to remain enabled. This may slightly increase the power usage of unused cores.

Accordingly, in some embodiments, the extended cache may be dynamically enabled. For example, at least one LLC slice (e.g., slice 0) is extended to keep a counter of the total number of MLC misses, and a counter of how many times an MLC miss was satisfied by one of the unused cores' MLCs. Each time Algorithm 1 is run (e.g., each time a core wakes up or goes to sleep), these counters are read to compute an extended cache hit ratio, where the counters are reset for the next interval.

In one embodiment, when the extended cache hit ratio is above a certain threshold (e.g. 10%), the MLC of unused cores remain active. In another embodiment, when the extended cache hit ratio is below the threshold, the extended cache is disabled. To ensure a hit ratio can be measured in the coming time interval, and potentially decide to enable the extended cache again, the "extended cache disabled" mode is implemented as described below.

For example, in some embodiments, one of the unused cores (the first core on the unused cores list, such as core C) is selected to have its MLC remain enabled. The target lists are constructed as described above, but the target entries corresponding to core C are filled in as normal while the other entries (pertaining to unused cores that are fully disabled) are filled with a value that, when selected by the LLC slice, cause the victim cache line to be dropped (or written back to DRAM if dirty) rather than being sent to a now fully disabled MLC. The extended cache hit ratio that is measured by slice 0, which will be used in the next interval, is corrected because fully disabled cores do not typically yield extended cache hits. The measured (extended cache hit/MLC misses) ratio is divided by a factor f, which is the number of times core C occurs on the target list of LLC slice 0 divided by the total number of entries on that target list, before comparing it to the threshold.

When implementing the dynamic algorithm, the usefulness of the extended cache enabled mode can be predicted, allowing the algorithm to switch to extended cache enabled mode when beneficial. The power cost in the extended cache disabled mode is reduced to keeping just one unused core's MLC active, as opposed to keeping all unused MLCs active. It should be appreciated that, in some embodiments, power can be further reduced to keep only that MLC's tag store active, but still power-gate the data storage. As such, the MLC can report hits/misses for the benefit of counting but may not actually provide any data.

Figure 5A:
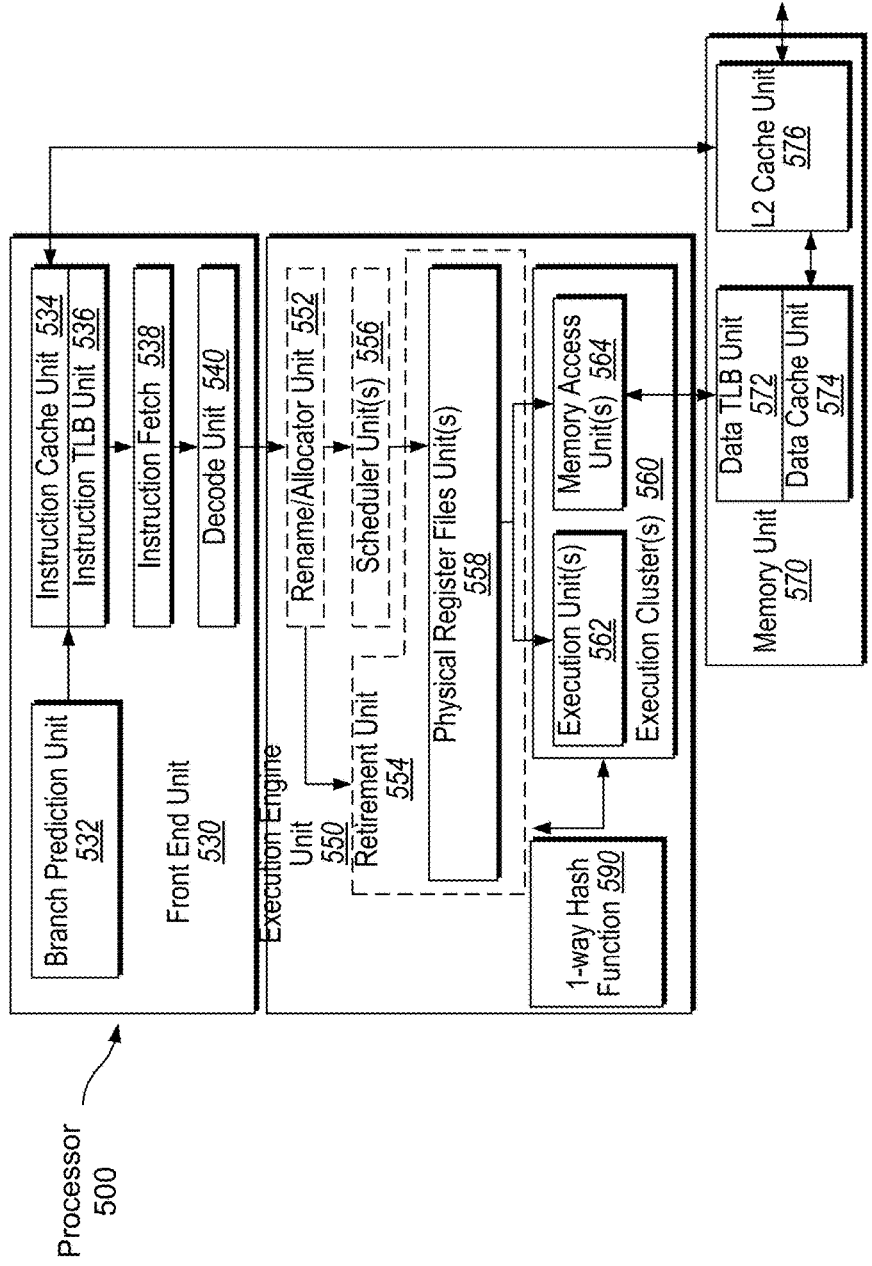
FIG. 5A is a block diagram illustrating a micro-architecture for a processor according to an embodiment of the disclosure.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may be part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as multi-core processor 105 as described with respect to FIG. 1 (and may be the same as multi-core processor 205 as described with respect to FIG. 2). In particular, processor 500 may include processing cores 110 and 112 as shown in FIG. 1 (and may include cores 210, 212, 214, and 215 as shown in FIG. 2).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5B:
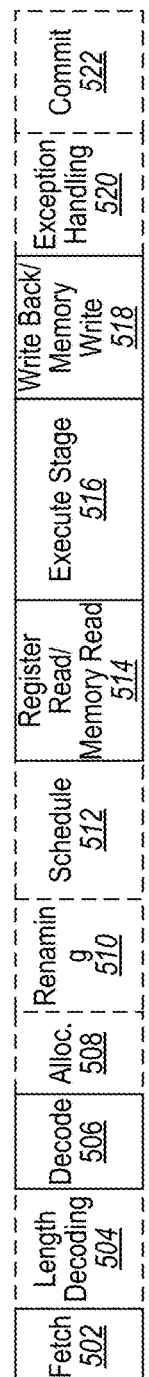
FIG. 5B is a block diagram illustrating an in-order pipeline and a register renaming stage, out-of-order issue/execution pipeline according to an embodiment of the disclosure.

FIG. 5B is a block diagram illustrating an in-order pipeline and a register renaming stage, out-of-order issue/execution pipeline implemented by processor 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor 500 as a pipeline includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
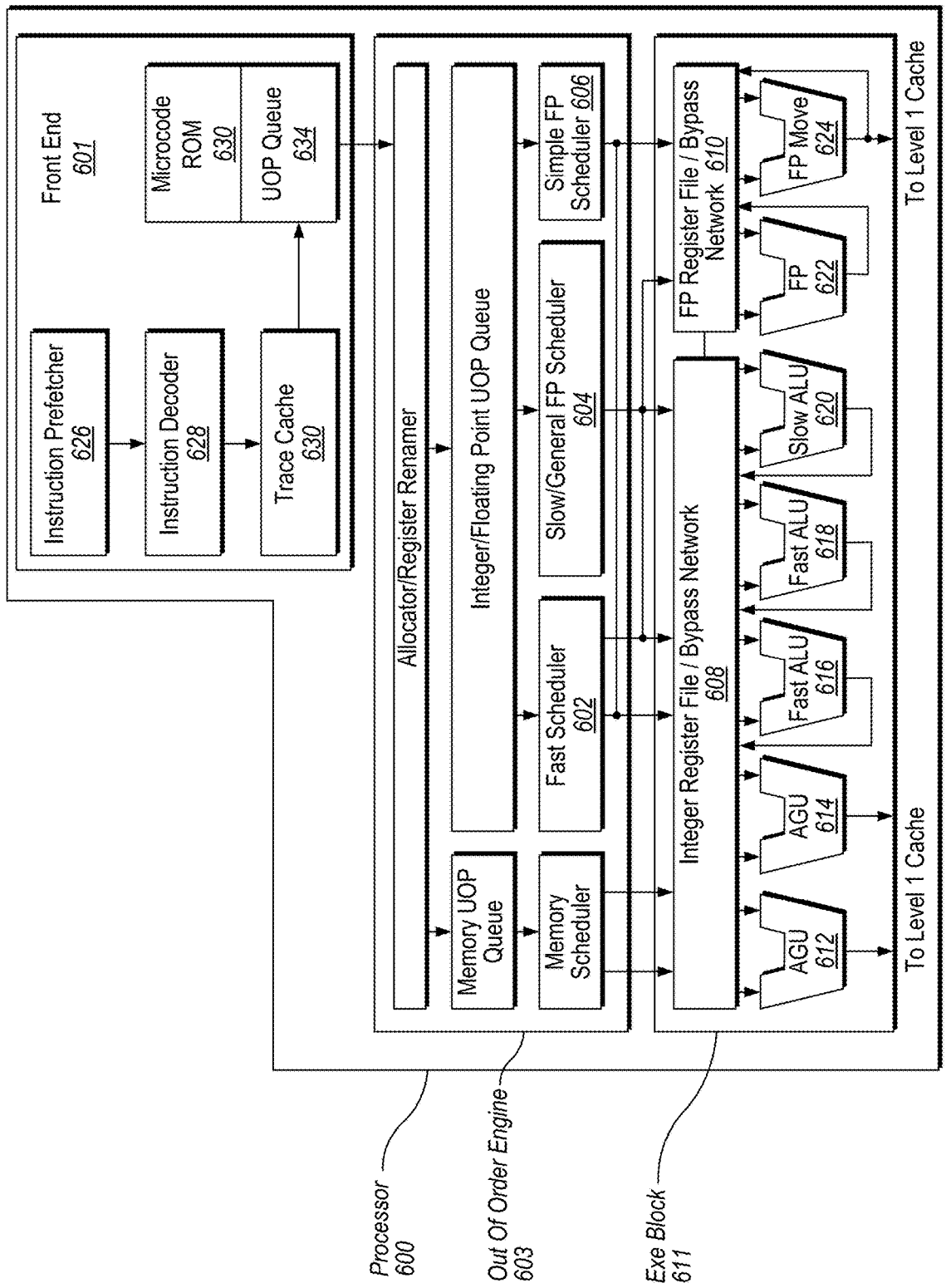
FIG. 6 is a block diagram illustrating a micro-architecture for a processor in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
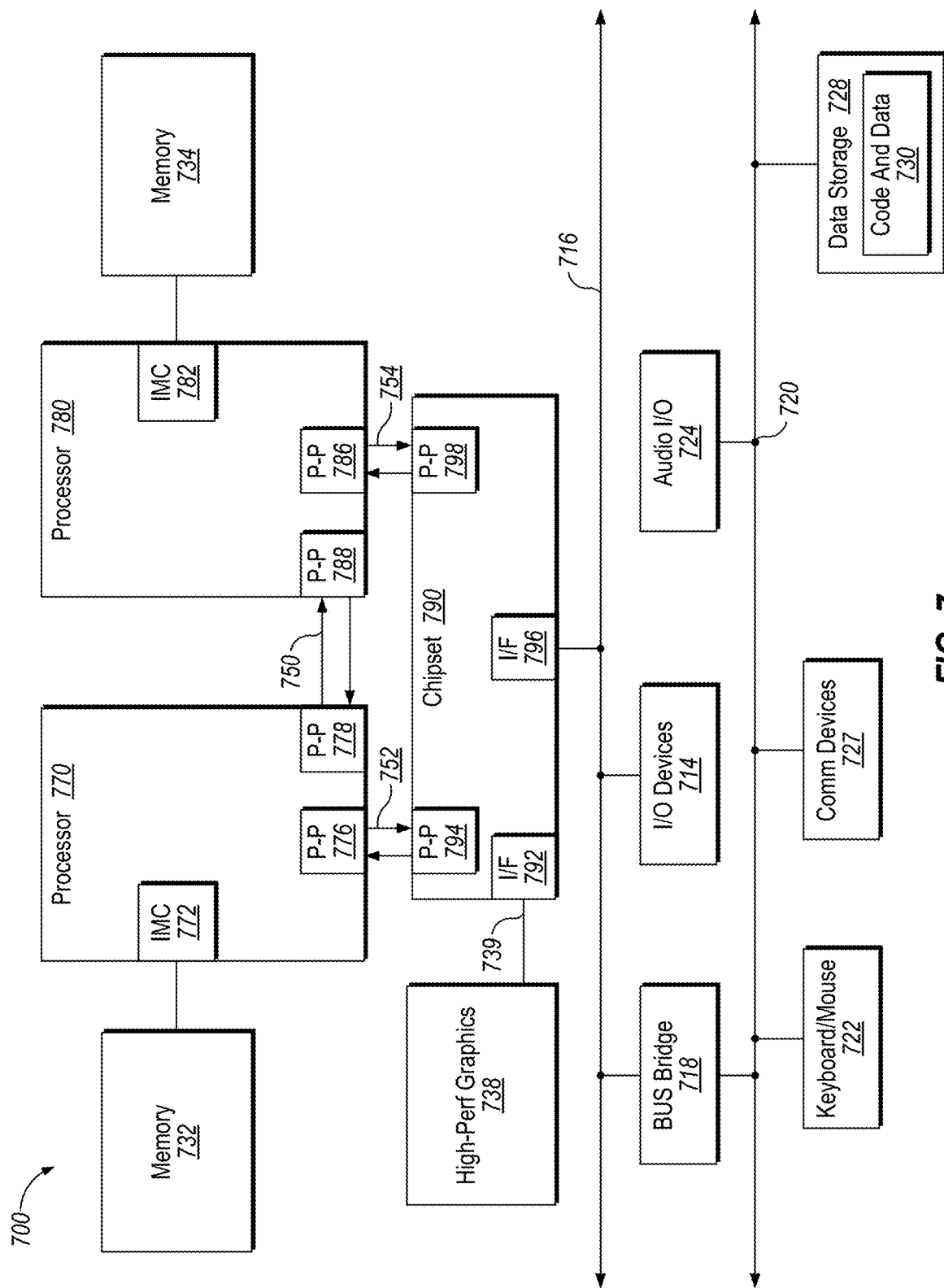
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
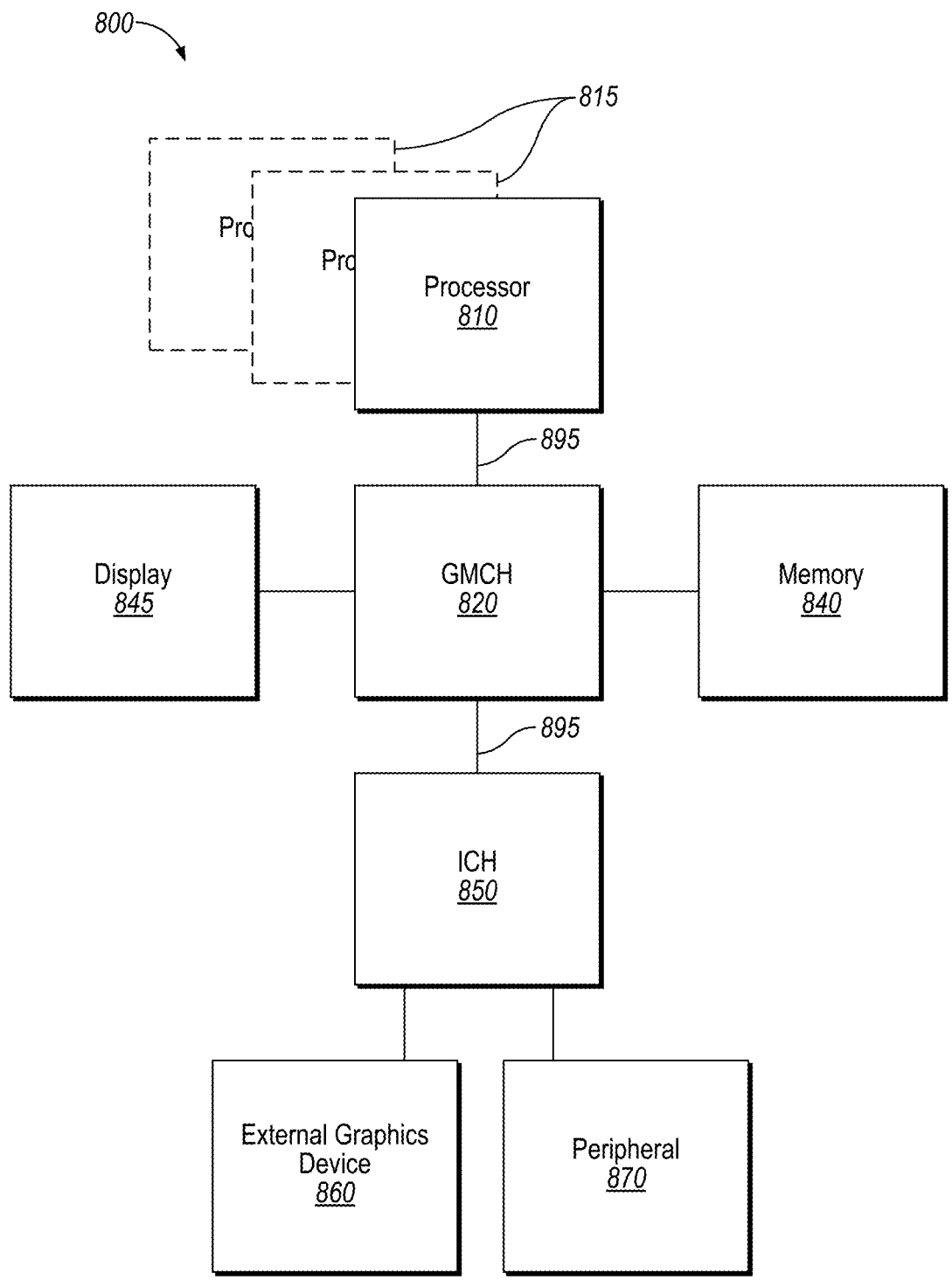
FIG. 8 is a block diagram illustrating a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
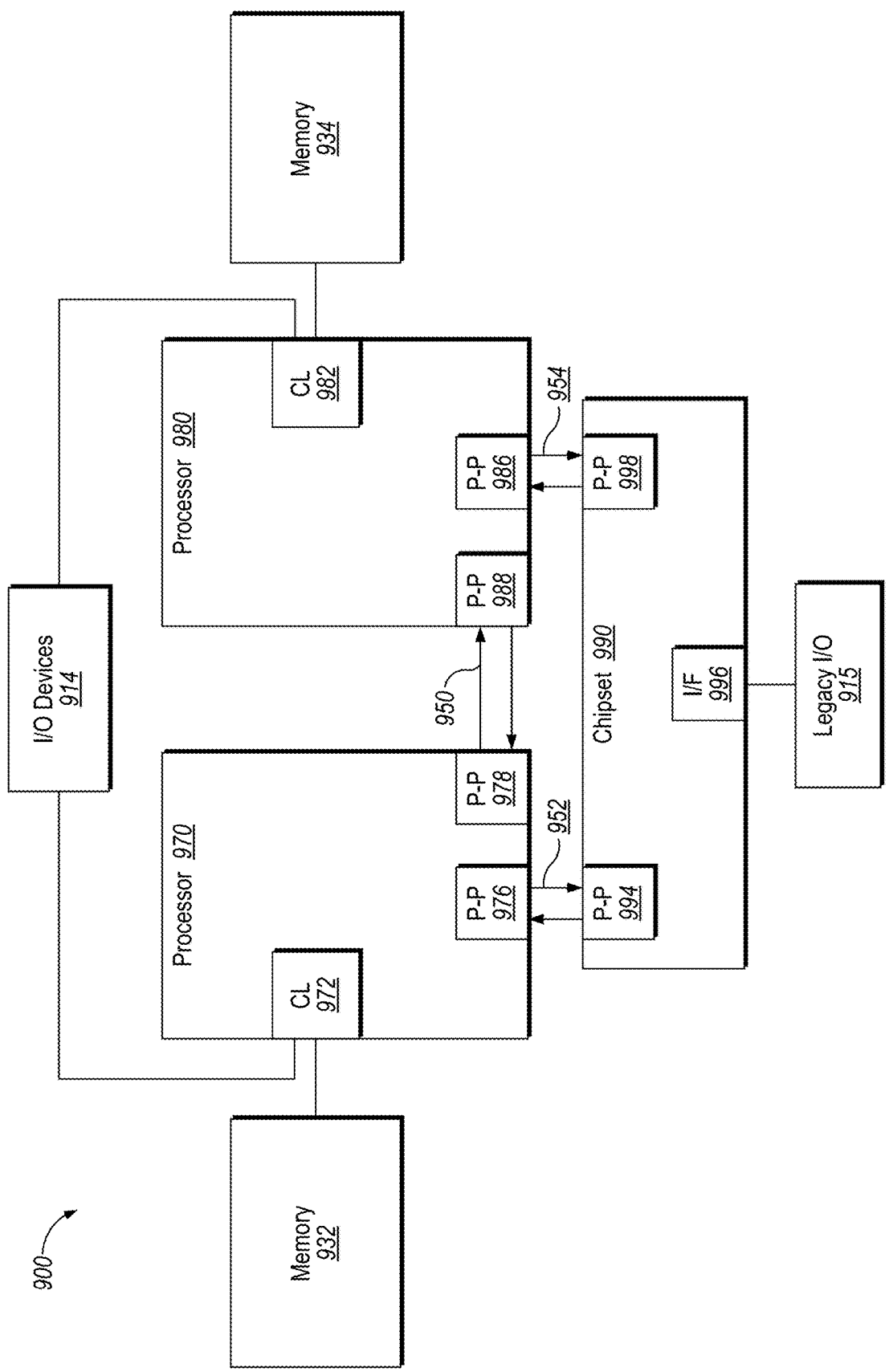
FIG. 9 is a block diagram illustrating a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
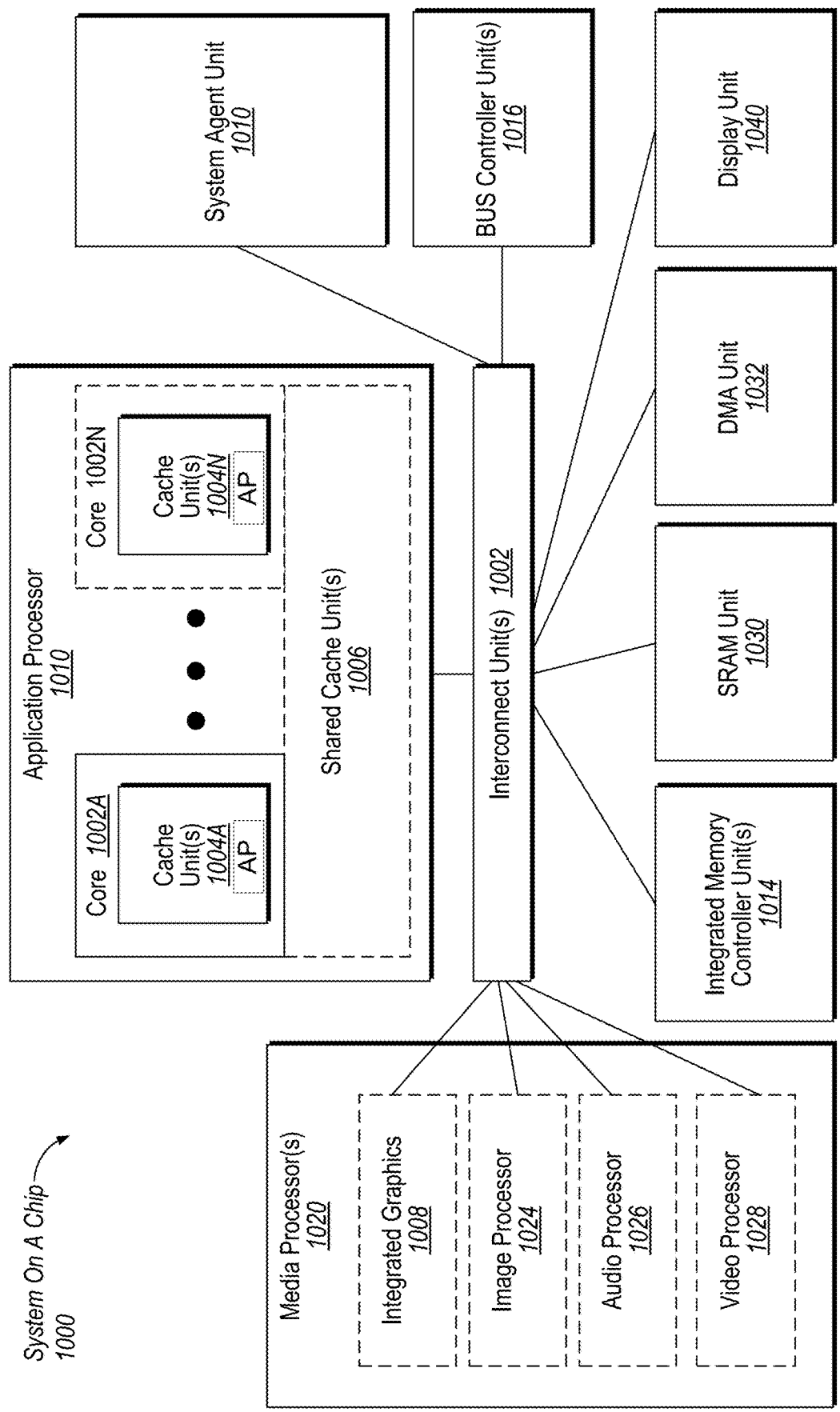
FIG. 10 is a block diagram illustrating a System-on-a-Chip (SoC) according to an embodiment of the disclosure.

Embodiments may be implemented in many different system types. FIG. 10 is a block diagram of a SoC 1000 in accordance with an embodiment of the present disclosure. Dashed lined boxes are optional features on more advanced SoCs. In some implementations, SoC 1000 as shown in FIG. 10 includes features of the system 100 as shown in FIG. 1. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
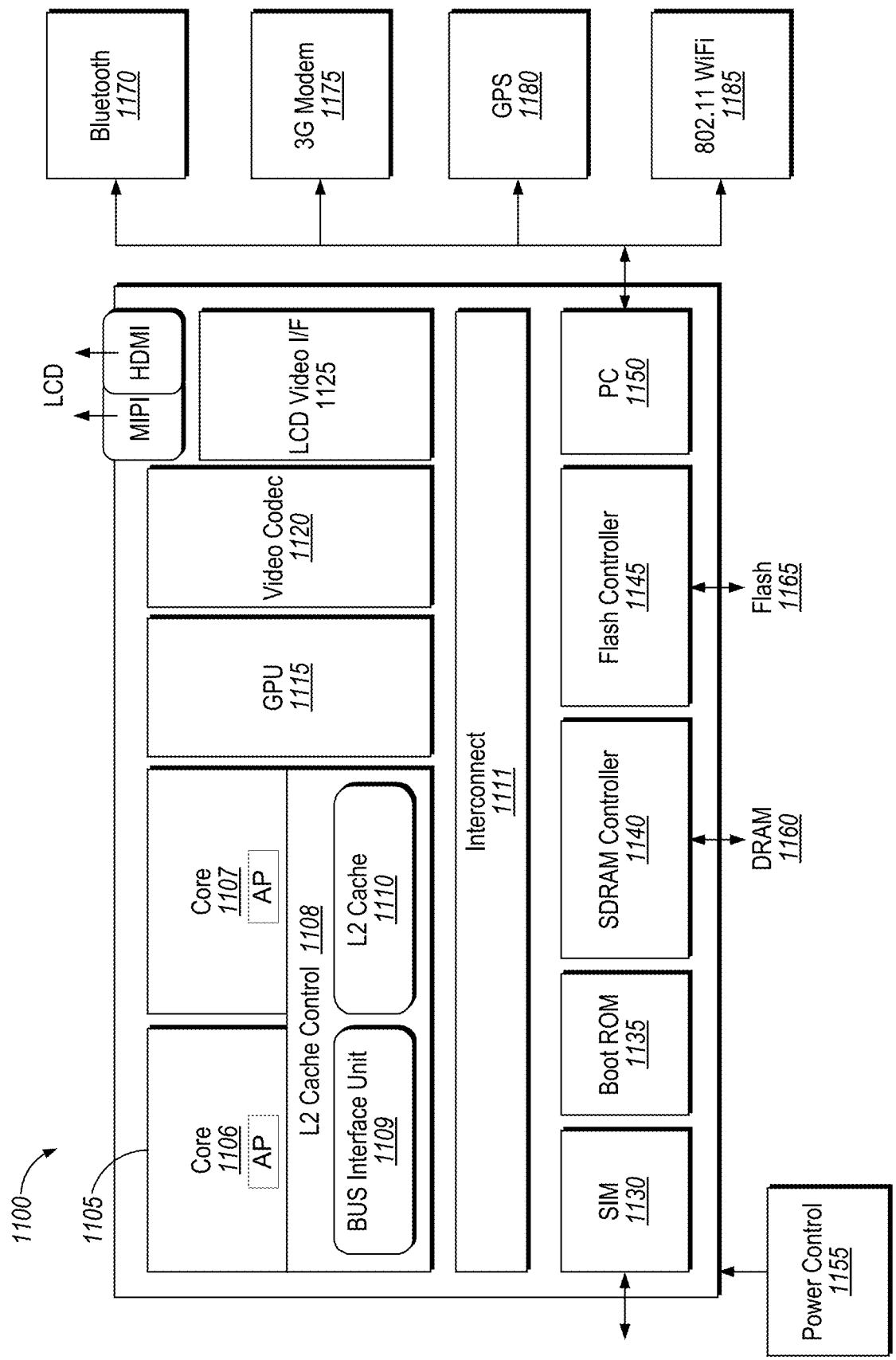
FIG. 11 is a block diagram illustrating a SoC design according to an embodiment of the disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
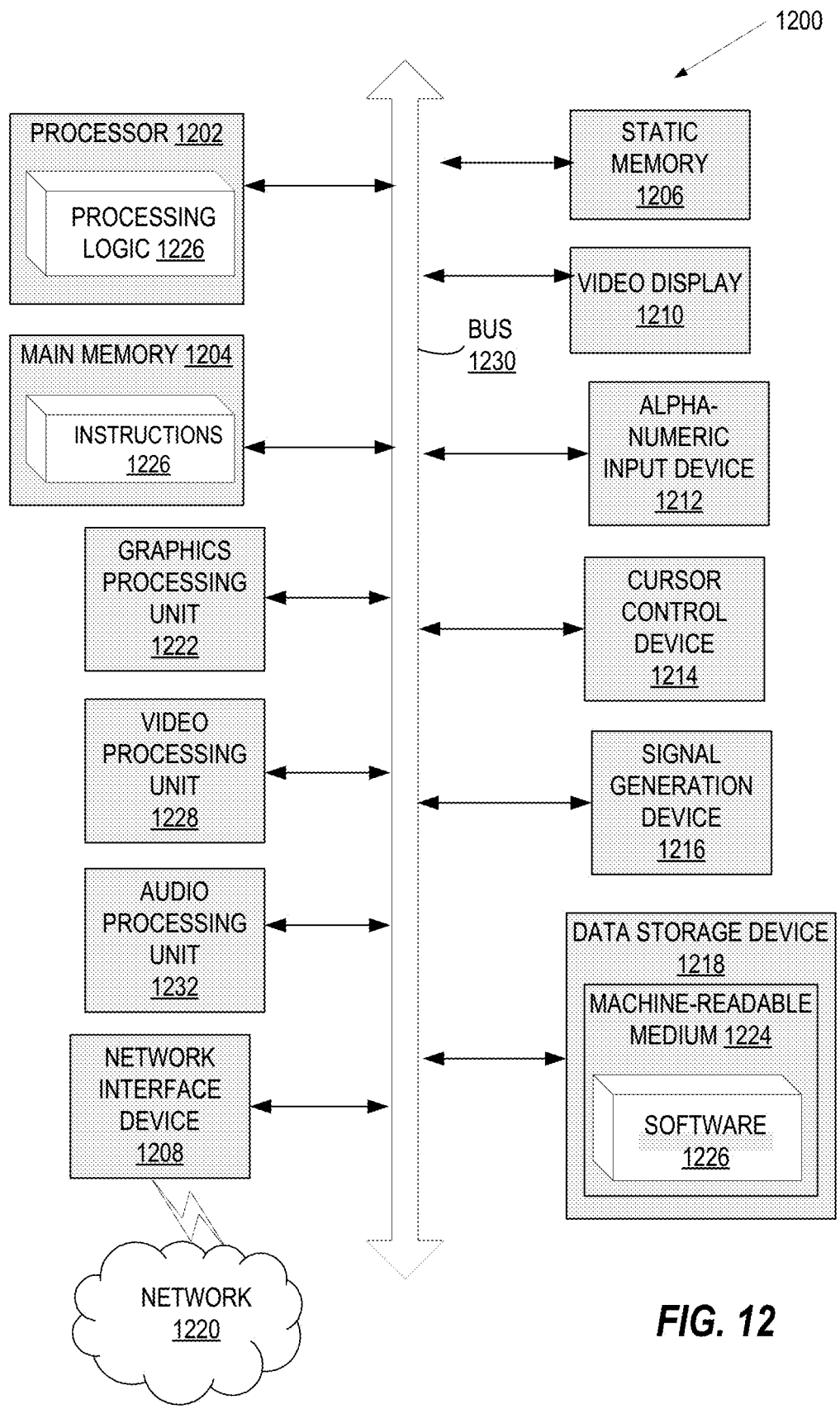
FIG. 12 illustrates a block diagram illustrating a computer system according to an embodiment of the disclosure.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or more processing cores. The processing device 1202 is configured to execute the processing logic 1226 for performing the operations and steps discussed herein. For example, processing logic 1226 may perform operations as described in FIGS. 3 and 4. In one embodiment, processing device 1202 is the same as system 100 described with respect to FIG. 1 (and the same as system 200 described with respect to FIG. 2) as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments.

Example 1 is a multi-core processor comprising 1) a first core; 2) a second core; 3), a first cache coupled to the first core, wherein the first cache is dedicated to the first core; 4) a second cache coupled to the second core, wherein the second cache is dedicated to the second core; 5) a third cache coupled to the first core and the second core, wherein the third cache is shared with the first core and the second core; and 4) a cache controller unit, operatively coupled to the first core, the first cache, the second core, the second cache, and the third cache, to: a) evict a first line from the first cache, wherein the first core is in an active state; b) in response to the evicting of the first line, store the first line in the third cache; c) in response to storing the first line, evict a second line from the third cache; and d) in response to evicting the second line, store the second line in the second cache, wherein the second core is in an idle state.

In Example 2, the multi-core processor of Example 1, wherein the cache controller unit is further to: in response to storing the second line in the second cache, evict a third line from the second cache to memory.

In Example 3, the multi-core processor of Example 1, wherein the idle state is a lower power state than the active state.

In Example 4, the multi-core processor of Example 1, wherein the idle state is a partially power-gated state.

In Example 5, the multi-core processor of Example 1, wherein the first core is a processing core.

In Example 6, the multi-core processor of Example 1, wherein the first core is a graphics core.

In Example 7, the multi-core processor of Example 1, wherein the first cache is a private mid-level cache.

In Example 8, the multi-core processor of Example 1, wherein the second cache is a private mid-level cache.

In Example 9, the multi-core processor of Example 1, wherein the third cache is a last-level cache.

Various implementations may have different combinations of the structural features described above. For instance, all optional features of the processors and methods described above may also be implemented with respect to a system described herein and specifics in the examples may be used anywhere in one or more implementations.

Example 10 is a system comprising: 1) a first core; 2) a first cache coupled to the first core, wherein the first cache is dedicated to the first core; 3) a second core; 4) a second cache coupled to the second core, wherein the second cache is dedicated to the second core; 5) a third cache coupled to the first core and the second core, wherein the third cache is shared between the first core and the second core; 6) a cache controller unit, operatively coupled to the first core, the first cache, the second core, the second cache, and the third cache, to: a) evict a first line from the first cache, wherein the first core is in an active state; b) in response to the evicting of the first line, store the first line in the third cache; c) in response to storing the first line, evict a second line from the third cache; and d) in response to evicting the second line, store the second line in the second cache, wherein the second core is in an idle state; and 7) system memory coupled to at least the cache controller unit.

In Example 11, the system of Example 10 wherein the cache controller unit is further to: in response to storing the second line in the second cache, evict a third line from the second cache to memory.

In Example 12, the system of Example 10 wherein the idle state is a lower power state than the active state.

In Example 13, the system of Example 10 wherein the idle state is a partially power-gated state.

In Example 14, the system of Example 10 wherein the first core is a processing core.

In Example 15, the system of Example 10 wherein the first core is a graphics core.

In Example 16, the system of Example 10 wherein the first cache is a private mid-level cache.

In Example 17, the system of Example 10 wherein the second cache is a private mid-level cache.

In Example 18, the system of Example 10 wherein the third cache is a last-level cache.

Various implementations may have different combinations of the structural features described above. For instance, all optional features of the processors and methods described above may also be implemented with respect to a system described herein and specifics in the examples may be used anywhere in one or more implementations.

In Example 19, is a method comprising: 1) evicting a first line from a first cache dedicated to a first core of a multi-core processor, wherein the first core is in an active state; 2) in response to evicting the first line, storing the first line in a third cache, wherein the third cache is shared between the first core and a second core; 3) in response to storing the first line, evicting a second line from the third cache; and 4) in response to evicting the second line, storing the second line in a second cache dedicated to the second core, wherein the second core is in an idle state.

In Example 20, the method of Example 19 further comprising: in response to storing the second line, evicting a third line from the second cache to memory.

Various implementations may have different combinations of the structural features described above. For instance, all optional features of the processors and methods described above may also be implemented with respect to a system described herein and specifics in the examples may be used anywhere in one or more implementations.

In Example 21, is a non-transitory computer-readable medium storing instructions, which when executed by a processor having a first core; a second core, a first cache coupled to the first core, wherein the first cache is dedicated to the first core; a second cache coupled to the second core, wherein the second cache is dedicated to the second core; a third cache coupled to the first core and the second core, wherein the third cache is shared with the first core and the second core; and a cache controller unit, cause the processor to execute a plurality of logic operations comprising: 1) evict a first line from the first cache, wherein the first core is in an active state; 1) in response to the evicting of the first line, store the first line in the third cache; 3) in response to storing the first line, evict a second line from the third cache; and 4) in response to evicting the second line, store the second line in the second cache, wherein the second core is in an idle state.

In Example 22, the non-transitory computer-readable medium of Example 21, wherein the cache controller unit is further to: in response to storing the second line in the second cache, evict a third line from the second cache to memory.

In Example 23, the non-transitory computer-readable medium of Example 21, wherein the idle state is a lower power state than the active state.

In Example 24, the non-transitory computer-readable medium of Example 21, wherein the idle state is a partially power-gated state.

In Example 25, the non-transitory computer-readable medium of Example 21, wherein the first core is a processing core.

In Example 26, the non-transitory computer-readable medium of Example 21, wherein the first core is a graphics core.

In Example 27, the non-transitory computer-readable medium of Example 21, wherein the first cache is a private mid-level cache.

In Example 28, the non-transitory computer-readable medium of Example 21, wherein the second cache is a private mid-level cache.

In Example 29, the non-transitory computer-readable medium of Example 21, wherein the third cache is a last-level cache.

Various implementations may have different combinations of the structural features described above. For instance, all optional features of the processors and methods described above may also be implemented with respect to a system described herein and specifics in the examples may be used anywhere in one or more implementations.

Example 30 is an apparatus comprising: 1) means for evicting a first line from the first cache, wherein the first core is in an active state; 2) means for, in response to the evicting of the first line, storing the first line in the third cache; 3) means for, in response to storing the first line, evicting a second line from the second cache; and 4) means for, in response to evicting the second line, storing the second line in the second cache, wherein the second core is in an idle state.

In Example 31, the apparatus of Example 30, further comprising, means for, in response to storing the second line in the second cache, evicting a third line from the second cache to memory.

In Example 32, the apparatus of Example 30, wherein the idle state is a lower power state than the active state.

In Example 33, the apparatus of Example 30, wherein the idle state is a partially power-gated state.

In Example 34, the apparatus of Example 30, wherein the first core is a processing core.

In Example 35, the apparatus of Example 30, wherein the first core is a graphics core.

In Example 36, the apparatus of Example 30, wherein the first cache is a private mid-level cache.

In Example 37, the apparatus of Example 30, wherein the second cache is a private mid-level cache.

In Example 38, the apparatus of Example 30, wherein the third cache is a last-level cache.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable of/to,' and/or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A multi-core processor comprising:
a first core;
a second core;
a first cache coupled to the first core, wherein the first cache is dedicated to the first core;
a second cache coupled to the second core, wherein the second cache is dedicated to the second core;
a third cache coupled to the first core and the second core, wherein the third cache is shared with the first core and the second core, wherein the third cache comprises a plurality of slices; and
a cache controller unit, operatively coupled to the first core, the first cache, the second core, the second cache, and the third cache, wherein the cache controller unit is to:
evict a first line from the first cache, wherein the first core is in an active state;
in response to evicting the first line, store the first line in the third cache;
in response to storing, in the third cache, the first line that was evicted from the first cache, evict a second line from the third cache;
in response to evicting the second line from the third cache and the second core being in an idle state, store the second line in the second cache, wherein the second cache is selected to store the second line based on a target map associated with a slice corresponding to the second line, wherein the target map comprises a list of unused cores; and
in response to the evicting of the second line from the third cache and each core of the multi-core processor being in the active state, cause the second line to be stored in memory.

2. The multi-core processor of claim 1, wherein the cache controller unit is further to:
in response to storing the second line in the second cache, evict a third line from the second cache to the memory.

3. The multi-core processor of claim 1, wherein the idle state is a lower power state than the active state.

4. The multi-core processor of claim 1, wherein the idle state is a partially power-gated state.

5. The multi-core processor of claim 1, wherein the first core is a processing core.

6. The multi-core processor of claim 1, wherein the first core is a graphics core.

7. The multi-core processor of claim 1, wherein the first cache is a private mid-level cache.

8. The multi-core processor of claim 1, wherein the second cache is a private mid-level cache.

9. The multi-core processor of claim 1, wherein the third cache is a last-level cache.

10. A system comprising:
a first core;
a first cache coupled to the first core, wherein the first cache is dedicated to the first core;
a second core;
a second cache coupled to the second core, wherein the second cache is dedicated to the second core;
a third cache coupled to the first core and the second core, wherein the third cache is shared between the first core and the second core, wherein the third cache comprises a plurality of slices;
a cache controller unit, operatively coupled to the first core, the first cache, the second core, the second cache, and the third cache, wherein the cache controller unit is to:
evict a first line from the first cache, wherein the first core is in an active state;
in response to evicting the first line, store the first line in the third cache;
in response to storing, in the third cache, the first line that was evicted from the first cache, evict a second line from the third cache; and
in response to evicting the second line from the third cache and the second core being in an idle state, store the second line in the second cache, wherein the second cache is selected to store the second line based on a target map associated with a slice corresponding to the second line, wherein the target map comprises a list of unused cores; and
system memory coupled to at least the cache controller unit, wherein in response to the evicting of the second line from the third cache and each core of the system being in the active state, cause the second line to be stored in memory.

11. The system of claim 10, wherein the cache controller unit is further to:
in response to storing the second line in the second cache, evict a third line from the second cache to the system memory.

12. The system of claim 10, wherein the idle state is a lower power state than the active state.

13. The system of claim 10, wherein the idle state is a partially power-gated state.

14. The system of claim 10, wherein the first core is a processing core.

15. The system of claim 10, wherein the first core is a graphics core.

16. The system of claim 10, wherein the first cache is a private mid-level cache.

17. The system of claim 10, wherein the second cache is a private mid-level cache.

18. The system of claim 10, wherein the third cache is a last-level cache.

19. A method comprising:
evicting a first line from a first cache dedicated to a first core of a multi-core processor, wherein the first core is in an active state;
in response to evicting the first line, storing the first line in a third cache, wherein the third cache is shared between the first core and a second core, wherein the third cache comprises a plurality of slices;
in response to storing, in the third cache, the first line that was evicted from the first cache, evict a second line from the third cache;
in response to evicting the second line from the third cache and the second core being in an idle state, store the second line in a second cache dedicated to the second core, wherein the second cache is selected to store the second line based on a target map associated with a slice corresponding to the second line, wherein the target map comprises a list of unused cores; and in response to the evicting of the second line from the third cache and each core of the multi-core processor being in the active state, causing the second line to be stored in memory.

20. The method of claim 19, further comprising:

in response to storing the second line, evicting a third line from the second cache to the memory.

\* \* \* \* \*